Jan. 27, 1959 — E. F. MORROW — 2,870,510
QUICK RELEASE MECHANISM
Filed Oct. 4, 1956 — 2 Sheets-Sheet 1

INVENTOR.
E. F. MORROW
BY Maybee & Legris
ATTYS.

Jan. 27, 1959  E. F. MORROW  2,870,510
QUICK RELEASE MECHANISM
Filed Oct. 4, 1956  2 Sheets-Sheet 2
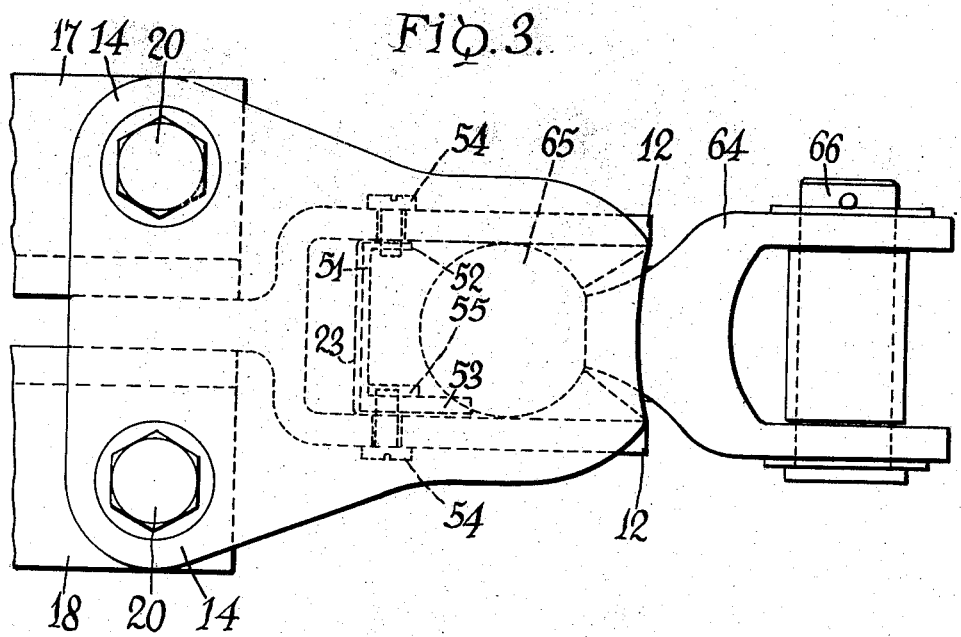
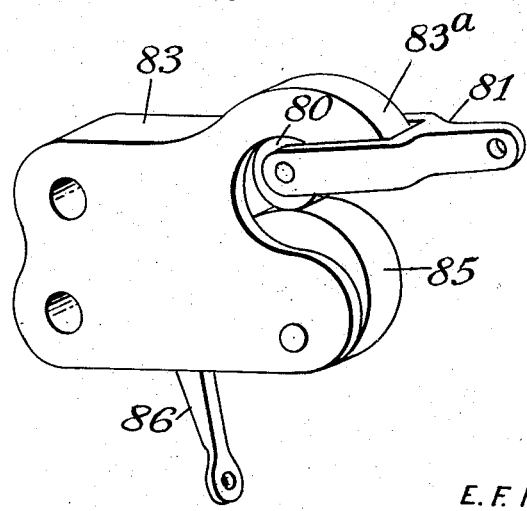
INVENTOR.
E. F. MORROW
BY Maybee & Legris
ATTYS.

United States Patent Office 2,870,510
Patented Jan. 27, 1959

2,870,510

QUICK RELEASE MECHANISM

Elmore Frank Morrow, Toronto, Ontario, Canada, assignor to Avro Aircraft Limited, Malton, Ontario, Canada, a corporation Application October 4, 1956, Serial No. 613,921

28 Claims. (Cl. 24—230)

This invention relates to a releasable connection, and more particularly to means for connecting members that are subjected to substantial tensile forces, facilitating their rapid disconnection from a remote point.

An important use of the mechanism of the present invention is in parabrake release units. Due to the high landing speeds and consequent long runs required by modern aircraft the strain on conventional landing wheel brakes is very high and in some instances intolerable. Accordingly, other means have been employed for supplementing or replacing the wheel braking action, such as additional flap-like air brakes fitted to the aircraft. However, in extreme cases the most effective supplemental braking has been attained by streaming a parachute from the rear of the aircraft fuselage, thus providing a quick-acting highly resistant air brake which rapidly decelerates the aircraft to a point where the conventional braking system can take over without overload.

In the use of a parabrake it is necessary that means be provided for quickly disposing of the parachute after it has served its purpose, so that it does not become a serious hindrance to ground handling of the aircraft. It is usual to provide a quick-release mechanism operable by the pilot whereby he can jettison the parachute at will.

While the quick-release connection of the present invention was originally designed for use with parabrakes, it is adaptable for other uses such as for lifeboat falls, marine aircraft, towing gear, lifting gear, aircraft bomb release, jettisonable fuel tanks, and the like.

A disadvantage of most releasable connections for the foregoing purposes resides in the number of moving parts required and the consequent high rate of wear since these mechanisms are subject to very heavy loads in operation. It is therefore an object of the present invention to provide a releasable connection of great strength, compactness and lightness and one with few moving parts, capable of withstanding the stresses occasioned by release under heavy tensile loads.

It is a further important object to provide a releasable connection which requires a very low operating force and which will release smoothly and positively under a wide range of tensile loads and other varying conditions. In the case of parabraking it is important that the release mechanism operate smoothly when the parachute is coning, that is when the parachute, being streamed at high velocity, tends to describe a helical path through the air, thus imposing oblique forces on the connection.

Other objects, advantages and uses of the invention will become apparent to those skilled in the art from a consideration of the following specification in conjunction with the accompanying drawings.

While preferred embodiments of the present invention are illustrated in the drawings and described in detail in the following specification, it is to be understood that such embodiments are by way of example and illustration only and that various modifications may be made without departing from the principles of the invention, the scope of which is limited only as defined in the appended claims.

In the drawings:

Fig. 3 is a top view of the unit of Figs. 1 and 2; and

Fig. 4 is a perspective view of a modified form.

Figure 1:
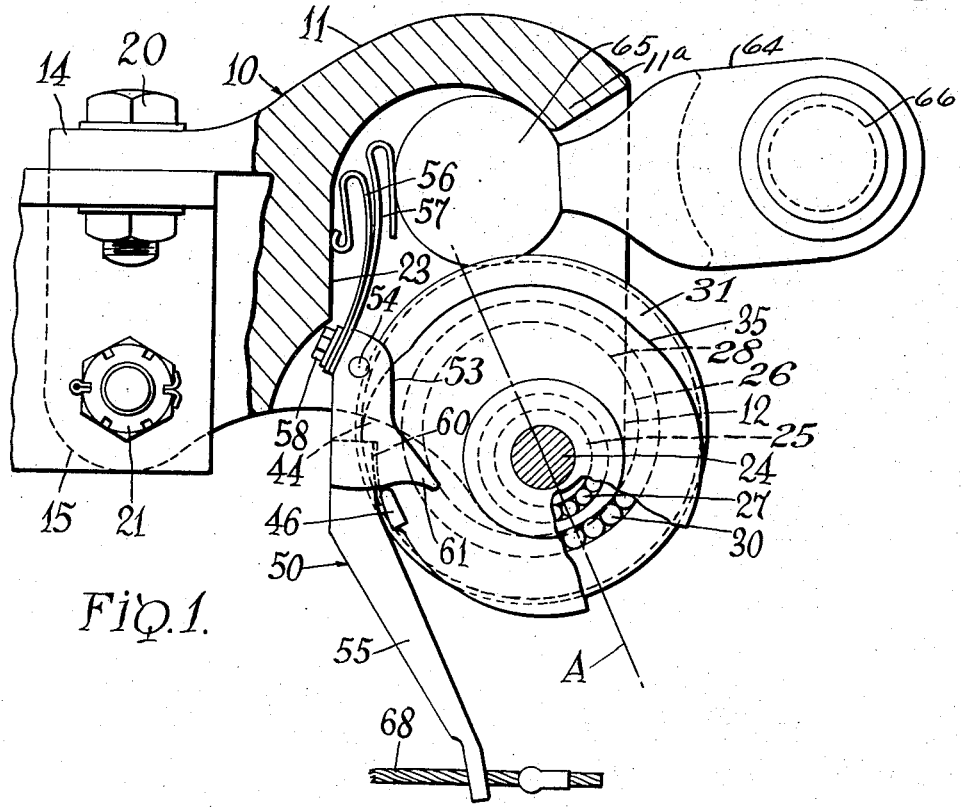
Fig. 1 is a side view of one form of parabrake release unit with portions broken way for clarity of illustration.
Figure 2:
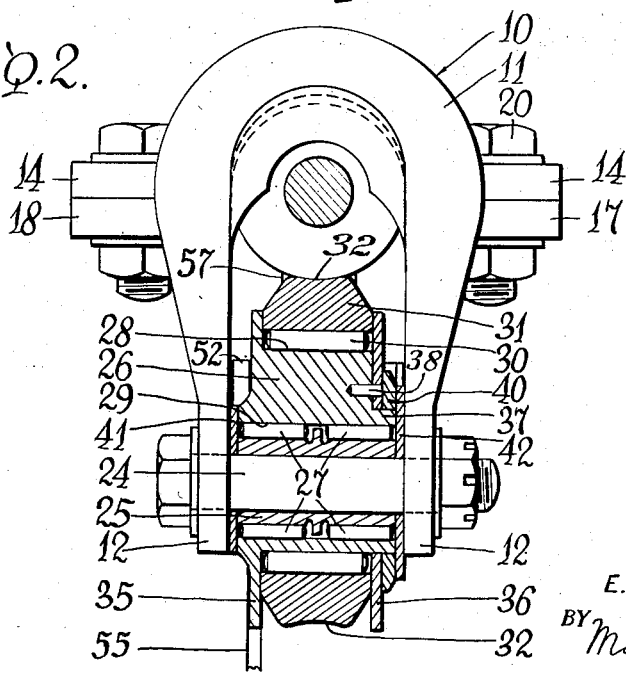
Fig. 2 is a rear, partly sectional view of the unit of Fig. 1, viewed from the right of Fig. 1.

Like characters of reference denote like parts throughout the drawings and, referring now particularly to the embodiment of the invention illustrated in Figs. 1, 2 and 3, the numeral 10 designates generally a main body member consisting of a partially spherical housing portion 11 which has depending therefrom a pair of spaced vertical flanges 12. At the front end of the body member 10 is a T-shaped mount consisting of a horizontal top flange 14 and a centrally depending flange 15. A pair of girders 17 and 18 extend rearwardly from an aircraft fuselage with the top flange 14 of member 10 bolted to the top surfaces of the girders as at 20 and the depending flange 15 of the member 10 bolted between the girders as at 21. The housing portion 11 of the body member 10 defines a chamber having a forward wall 23 from which the flange 15 extends forwardly. The chamber has a rearward opening bounded at the top by an abutment lip 11$^a$ and at the bottom by an eccentric locking and releasing assembly now to be described.

The eccentric assembly is mounted upon a spindle bolt 24 that extends between the spaced depending flanges 12 of the body member 10, transversely to the longitudinal, or front to rear axis of the entire unit. An inner needle bearing race 25 is provided around the spindle bolt 24, and the outer race is formed by an eccentric member 26, there being a double row of needle bearings 27 between inner race 25 and eccentric member 26. The eccentric member 26 has an external peripheral surface 28 which is eccentric with respect to its internal peripheral surface 29, and the member forms the inner race for a second set of needle bearings 30. The outer race for the needle bearings 30 is a circular portion 31 which has a transversely concave outer surface 32 (Fig. 2), and is of the same cross section at any diameter of the circular rim portion.

Eccentric member 26 has a side flange 35, and a disc 36 is mounted at the other side of the member upon an axially extending annular flange designated 37 in Fig. 2. A dowel 38 prevents rotation of the disc 36 relative to eccentric member 26 and the outer surface of disc 36 is knurled to permit manual rotation of eccentric member 26 for a purpose which will presently appear. Flange 35 and disc 36 serve as end retainers for the needle bearings 30 and also for the rim portion 31.

A spacing washer 40 is located on the spigot 37 of eccentric member 26, and a pair of washers 41 and 42 serve to retain the needle bearings 27, disc 36 and spacing washer 40. The radial peripheries of flange 35 and disc 36 are generally concentric with the axis of spindle bolt 24. The periphery of flange 35 has a radially projecting bill 44, and the flange is further provided near its periphery with a lug 46 projecting transversely to the longitudinal axis of the unit, parallel to the axis of spindle bolt 24.

A control arm designated generally by the numeral 50 forms a releasable means for locking the position of the eccentric member 26 and has an upper fulcrum portion of channel form, having a web portion 51 (Fig. 3) and side flanges 52 and 53. The arm 50 is pivotally mounted between the depending flanges 12 of body member 10 by means of a pair of pins 54 which thread into the flanges 12 as shown in Fig. 3 and bear rotatably at their inner ends in the flanges 52 and 53 of arm 50. The arm 50 has an actuating lever 55 extending downwardly from the inner face of flange 53. The upper end 60 of the lever 55 provides a stop adapted to engage under the bill 44, and the flange 53 has a camming spur 61 adapted to overlie and engage the lug 46.

A pair of leaf springs 56 and 57 are fixed to the forward surface of the web portion 51 by a bolt 58. The free end of spring 56 bears against the forward wall 23 of the chamber of housing portion 11, while the free end portion of spring 57 projects into such chamber out of contact with its walls.

The mechanism thus far described forms one of two connectible and releasable members. The other member, in the present embodiment, is formed by a clevis 64 having spherical ball end 65 or holding portion adapted to be received and held in the chamber formed by housing portion 11 of body member 10. The clevis 64 has a pin 66 to which a parachute may be connected, the pin being preferably of copper or other material calculated to shear under predetermined excessive loads.

The operation of the foregoing mechanism will now be described. Before the ball end 65 of clevis 64 is inserted into the chamber in the housing portion 11, the leaf spring 56 urges the control arm 50 in a clockwise direction as viewed in Fig. 1 so that the stop 60 and camming spur 61 are free of their cooperating formations 44 and 46 of flange 35. In this position of the control arm, 50 the knurled surface of the disc 36 may be employed to rotate the eccentric member 26 manually to a position roughly opposite to that illustrated in Fig. 1, wherein a low (or dwell) part of the eccentric assembly is uppermost. Under these circumstances the ball end 65 can be inserted beneath the abutment lip 11$^a$ of housing portion 11. The ball end 65 presses against leaf spring 57, which is substantially stiffer than leaf spring 56, causing control arm 50 to be urged in a counter clockwise direction.

The eccentric assembly is then rotated, again by grasping the knurled portion of disc 36, in a clockwise direction. This causes the bill 44 to cam lever 55 somewhat to the left as viewed in Fig. 1, against the resistance of spring 57, until the stop 60 snaps under the bill 44. At the same time the spur 61 engages the lug 46, so that the eccentric assembly is locked and cannot rotate in either direction. The parts are thus in the position illustrated in Fig. 1. Now a high (or rise) part of the eccentric assembly is in a position where the opening to the chamber of the housing portion 11 is constricted and the ball end 65 is retained against release from the chamber. More precisely, the line of contact between the ball end and the rim portion 31 is slightly to the right of the highest point of the eccentric assembly, as indicated by the line A which passes through the high and low points of the eccentric member 26, through the geometric centre of the rim portion 31 and through its axis of rotation. Thus the ball end exerts a force against the rim portion 31 of the eccentric near to but distinct from the high point of the eccentric assembly, and this force has a component tangential to the circular rim portion 31 tending to rotate it in a clockwise direction and a component radial to the circular rim portion 31 tending to rotate the eccentric member 26 in a counterclockwise direction. This rotative component is resisted by the engagement of bill 44 with stop 60. The force exerted by the bill 44 against the stop 60 and that of the lug 46 against the camming spur 61 will pass approximately through the pivot 54 of the arm 50 so that the arm 50 is incapable of being rotated and disengaged from the eccentric by the force of the ball end 65 on the rim portion 31.

When it is desired to release the connection, and referring again by way of example to the release of a braking parachute, the pilot operates a pull cable 68 from the cockpit, pulling control arm 50 to the left as viewed in Fig. 1 and thus withdrawing the stop 60 from its arresting engagement with bill 44. This releases the eccentric member 26 for rotation in a counterclockwise direction under the pressure that the ball end 65 exerts against the rim portion 31. This rotation of the eccentric member 26 causes the rim portion 31 to be withdrawn from its constricting position at the chamber opening so that the ball end can slip out of engagement with the body member 10. The circular profile of the ball end in the vertical longitudinal plane of the unit facilitates the movement of the ball end. As the ball end slips away, the rotative mounting of the rim portion 31 on the eccentric member 26 frees the latter from any frictional drag by the ball end 65, the rim portion 31 being free to rotate clockwise with the ball as it passes through the opening between the abutment 11$^a$ and the rim portion. Release of the ball end 65 relieves the pressure on spring 57, and spring 56 therefore maintains the control arm 50 in its fully forward position (to the left). The eccentric assembly continues to rotate until the inertia imparted to it by release of the ball end is used up.

The rotative component of force exerted by the ball end 65 on the eccentric assembly is intentionally very low in magnitude compared to the large tensile forces to which the releasable connection is subjected in use. To prevent any sticking or failure to start on the part of the eccentric assembly, the camming spur 61, at the point when stop 60 disengages from bill 44, begins to cam against the upper end of lug 46 to start the eccentric mechanism in a counterclockwise direction, thus overcoming what starting friction may be present and thus further insuring immediate and certain operation of the release mechanism.

The modification of Fig. 4 is a simplification of the embodiment of Figs. 1 to 3 which is adequate and operable for certain uses of the release mechanism of the present invention. In Fig. 4 the ball end 65 of the clevis 64 is replaced by a freely rotatable cylindrical roller 80 carried by a clevis 81. This modification is particularly useful where the mechanism is subject to pulling forces acting directly along the longitudinal axis of the unit, or acting in a direction slightly inclined to the longitudinal axis, as distinguished from the oblique forces engendered by a coning parachute, as described earlier.

In the modification of Fig. 4 the body member 83 serves the same purpose as body member 10 of the previous embodiment. The overhanging lip abutment 83$^a$ is merely arcuately curved instead of being partly spherical, and the outer periphery of the eccentric member 85 is flat and engages the roller 80 without having an intervening rim. Other details of this embodiment may be the same as previously described in connection with Figs. 1 to 3, including the construction and operation of control arm 86 for effecting release of the connection.

What I claim as my invention is:

1. A releasable connection comprising a pair of releasable members adapted to be subjected to a force tending to pull the members apart, one of the members comprising housing means having a chamber opening toward the other member, the other member having a holding portion adapted to be disposed in the chamber, a rotatable eccentric member carried by the housing means and having a peripheral portion adapted in a first rotative position of the eccentric member to constrict the chamber opening and retain the holding portion against release therethrough, the eccentric member being rotatable to a second position to withdraw the peripheral portion from its constricting position, the holding portion under the pull of the force on the connection exerting a force against the peripheral portion having a component tending to rotate the eccentric member to its second position, the holding portion being movable through the chamber opening with the peripheral portion withdrawn from its constricting position, and selectively releasable means engageable with the eccentric member for locking the eccentric member in its first position, the releasable means being incapable of release by the force of the holding portion against the peripheral portion of the eccentric member.

2. A connection as claimed in claim 1, wherein the axis of the rotatable eccentric member is transverse to the direction of movement of the holding portion through the chamber opening.

3. A connection as claimed in claim 2, wherein the peripheral portion is rotatable on the eccentric member about an axis parallel to the axis of the eccentric member.

4. A releasable connection comprising a pair of releasable members adapted to be subjected to a force tending to pull the members apart, one of the members having an abutment portion, the other member having a holding portion adapted to engage the abutment portion, a rotatable eccentric member carried by said one member and having a peripheral portion adapted in a first rotative position of the eccentric member to engage the holding portion and, with the abutment portion, to retain the holding portion against release under the pull of the force on the connection, the eccentric member being rotatable to a second position to withdraw the peripheral portion from its retaining position, the holding portion under the pull of the force on the connection exerting a force against the peripheral portion having a component tending to rotate the eccentric member to its second position, the holding portion being releasable from the abutment portion and peripheral portion with the peripheral portion withdrawn from its retaining position, and selectively releasable means for locking the eccentric member in its first position, the releasable means being incapable of release by the force of the holding portion against the peripheral portion of the eccentric member.

5. A connection as claimed in claim 4, wherein the releasable means comprises a stop engageable with the eccentric member to prevent movement of the eccentric member from its first position, and remotely controllable means for withdrawing the stop from engagement with the eccentric member.

6. A connection as claimed in claim 4, including camming means operable upon release of the releasable means to urge the eccentric member towards its second position.

7. A connection as claimed in claim 4, wherein the releasable means comprises an arm engageable with the eccentric member to prevent movement of the eccentric member from its first position, and means actuated by said other member when retained by the abutment and peripheral portions to urge the arm into engagement with the eccentric member.

8. A connection as claimed in claim 7, wherein the urging means is a spring stressed by said other member when retained but unstressed when said other member is released.

9. A connection as claimed in claim 8, wherein another spring weaker than the first bears against said one member and constantly urges the arm to disengage the eccentric member.

10. A connection as claimed in claim 4, wherein the holding portion has a circular profile that engages the abutment portion and the peripheral portion, the axis of the eccentric member being parallel to the axis of said circular profile.

11. A connection as claimed in claim 10, wherein the holding portion is a roller.

12. A connection as claimed in claim 10, wherein the holding portion is a spherical end portion of said other member, the peripheral portion being concave to fit against the spherical end portion.

13. A releasable connection comprising a pair of releasable members adapted to be subjected to a tensile force axially of the connection tending to pull the members apart, one of the members comprising housing means having a chamber opening toward the other member, the other member having an end portion adapted to be disposed in the chamber, an eccentric member and anti-friction bearing means mounting the eccentric member for rotation on an axis transverse to the axis of the connection, the eccentric member having a rim portion and anti-friction bearing means mounting the rim portion for rotation about the exterior of the eccentric member, the rim portion being adapted in a first rotative position of the eccentric member to constrict the chamber opening and retain the end portion against release therethrough, the eccentric member being rotatable to a second position to withdraw the rim portion from its constricting position, the end portion under tensile pull on the connection exerting a force against the rim portion having a component tending to rotate the eccentric member to its second position, the end portion being movable through the chamber opening with the rim portion withdrawn from its constricting portion, and selectively releasable means for locking the eccentric member in its first position.

14. A parabrake release mechanism comprising a pair of releasable members adapted to be subjected to the pull of an open parachute tending to pull the members apart, one of the members including an abutment, and eccentric having a peripheral portion that defines a complete circle, the eccentric being rotatably mounted on the one member on an axis of rotation that is eccentric to said circle, the eccentric having a peripheral high point and a peripheral low point that are co-linear with said axis and the centre of said circle, the other member having a holding portion that is held by the eccentric and the abutment in a first rotative position of the eccentric and that is released when the eccentric is rotated to a second position, and releasable means for holding the eccentric in the first position, the holding portion of the other member in the first position of the eccentric and under the pull of an open parachute on the connection exerting a force against the peripheral portion of the eccentric at a location near to but distinct from said high point to move the eccentric to the second position upon release of the releasable means.

15. A parabrake release mechanism as claimed in claim 14, in which the eccentric includes an inner eccentric member rotatable about said axis, and in which the peripheral portion of the eccentric is a circular rim portion around the eccentric member and rotatable thereon about the centre of said circle, the force of the holding portion of the other member on the rim having a component tangential to the rim portion that causes the rim portion to rotate on the eccentric member upon release of the releasable means, and a component radial to the rim portion that moves the eccentric to the second position upon release of the releasable means.

16. A parabrake release mechanism as claimed in claim 15, in which the rim portion is mounted on the eccentric member by anti-friction bearings.

17. A parabrake release mechanism comprising a pair of releasable members adapted to be subjected to the pull of an open parachute tending to pull the members apart, an eccentric member, a peripheral rim portion mounted on the eccentric member so as to be rotatable thereon, the rim portion defining a complete circle, the eccentric member being rotatably mounted on one of the releasable members on an axis of rotation that is eccentric to said circle, the other releasable member having a holding portion, the one releasable member having means which co-operate with the eccentric member to hold the holding portion in a first rotative position of the eccentric member, the holding portion being released when the eccentric member is rotated to a second position, and releasable means for holding the eccentric member in the first position, the holding portion of the other releasable member in the first rotative position of the eccentric member and under the pull of an open parachute acting against the peripheral portion of the eccentric member to force the eccentric member to the second position upon release of the releasable means.

18. A parabrake release mechanism as claimed in claim 17, in which the releasable means include camming means operable upon release of the releasable means to urge the eccentric member towards its second position.

19. A parabrake release mechanism as claimed in claim 17, including yieldable means engaged by the holding portion when the releasable members connected together, the yieldable means when engaged by the holding portion urging the releasable means to hold the eccentric member in its first position.

20. A parabrake release mechanism comprising a pair of releasable members adapted to be subjected to a force tending to pull the members apart, an eccentric rotatably mounted on one of the members, the other member having a holding portion, the one member having means which co-operate with the eccentric to hold the holding portion in a first rotative position of the eccentric, the holding portion being released when the eccentric is rotated to a second position, releasable means for engaging and holding the eccentric in the first position, and yieldable means engaged by the holding portion when held by the eccentric and said co-operating means, the yieldable means when engaged by the holding portion urging the releasable means to hold the eccentric in the first position.

21. A parabrake release mechanism as claimed in claim 20, in which the releasable means include camming means operable upon release of the releasable means to urge the eccentric towards its second position.

22. A parabrake release mechanism as claimed in claim 20, in which the yieldable means is a spring stressed by engagement with the holding portion when the latter is held by the eccentric and said co-operating means but unstressed when the holding portion is released.

23. A parabrake release mechanism as claimed in claim 22, including another spring weaker than the first mentioned spring bearing against said one member and constantly urging the releasable means to disengage the eccentric, said other spring holding the releasable means free of the eccentric when the first mentioned spring is unstressed.

24. A parabrake release mechanism as claimed in claim 20, in which the releasable means include a stop that engages the eccentric and remotely controllable means for withdrawing the stop from engagement with the eccentric.

25. A parabrake release mechanism comprising a pair of releasable members adapted to be subjected to the pull of an open parachute tending to pull the members apart, one of the members comprising housing means having a chamber with an opening towards the other member, a rotatable eccentric member carried by the housing means and having a peripheral rim portion that defines a complete circle, the eccentric member having an axis of rotation that is eccentric to said circle, and the rim portion being rotatable independently of the eccentric member about the centre of said circle, the other member having a holding portion adapted to be disposed in the chamber, the rim portion being adapted in a first rotative position of the eccentric member to constrict the chamber opening and retain the holding portion against release therefrom, the eccentric member being rotatable to a second position to withdraw the rim portion from the constricting position, the holding portion under the pull of an open parachute acting against the rim portion to force the eccentric member to the second position, the holding portion being movable through the chamber opening with the rim portion withdrawn from its constricting position, and selectively releasable means for locking the eccentric member in its first position.

26. A parabrake release mechanism as claimed in claim 25, in which the rim portion and holding portion are so disposed that the major portion of the force of the holding portion on the rim portion is in a direction tangential of the rim portion.

27. A parabrake release mechanism as claimed in claim 25, in which the holding portion is a spherical end portion of the other member and the peripheral portion is concave to fit against the spherical end portion.

28. A parabrake release mechanism comprising a pair of releasable members adapted to be subjected to the pull of an open parachute tending to pull the members apart, one of the members having housing means having a chamber with an opening towards the other member, a rotatable eccentric member having a peripheral circular rim portion that defines a complete circle, the eccentric member having an axis of rotation that is eccentric to said circle, the rim portion being rotatable independently of the eccentric member about the centre of said circle, the other member having a spherical end portion adapted to be disposed in said chamber, the rim portion being adapted in a first rotative position of the eccentric member to constrict the chamber opening and retain the spherical end portion against release therefrom, the eccentric member being rotatable to a second position to withdraw the rim portion from its constricting position, said spherical end portion under the pull of an open parachute acting against the rim portion of the eccentric member to force the eccentric member to its second position, said spherical end portion being movable through the chamber opening with the rim portion withdrawn from its restricting position, an arm engageable with the eccentric member to prevent movement of the eccentric member from its first position, a first spring urging the arm into engagement with the eccentric member, the spring being stressed by said spherical end portion when the releasable members are connected together but unstressed when the releasable members are disconnected, and another spring weaker than the first spring that bears against the housing constantly urging the arm to disengage the eccentric member.

References Cited in the file of this patent

UNITED STATES PATENTS

| | | |
|---|---|---|
| 798,962 | Harris | Sept. 5, 1905 |
| 2,115,629 | Gurley | Apr. 26, 1938 |
| 2,488,537 | Hattan | Nov. 22, 1949 |
| 2,789,468 | Burns | Apr. 23, 1957 |